Nov. 9, 1965 R. G. WENTHE 3,216,875
METHOD OF MAKING STRUCTURAL MATERIALS
Filed April 17, 1958 5 Sheets-Sheet 1

INVENTOR.
RAYMUND G. WENTHE
BY Bauer and Seymour
ATTORNEYS

Nov. 9, 1965 R. G. WENTHE 3,216,875
METHOD OF MAKING STRUCTURAL MATERIALS
Filed April 17, 1958 5 Sheets-Sheet 2
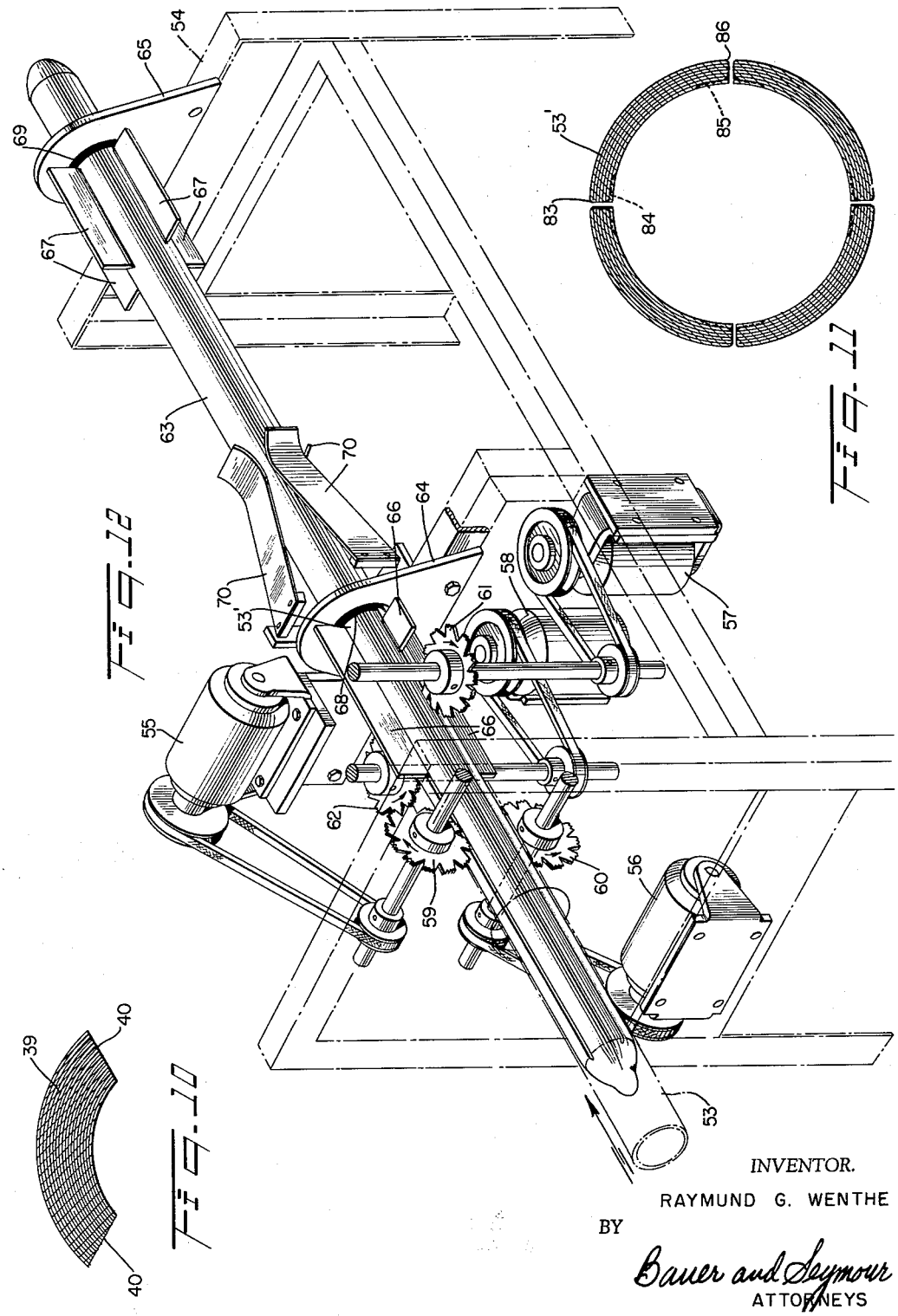
INVENTOR.
RAYMUND G. WENTHE
BY
Bauer and Seymour
ATTORNEYS

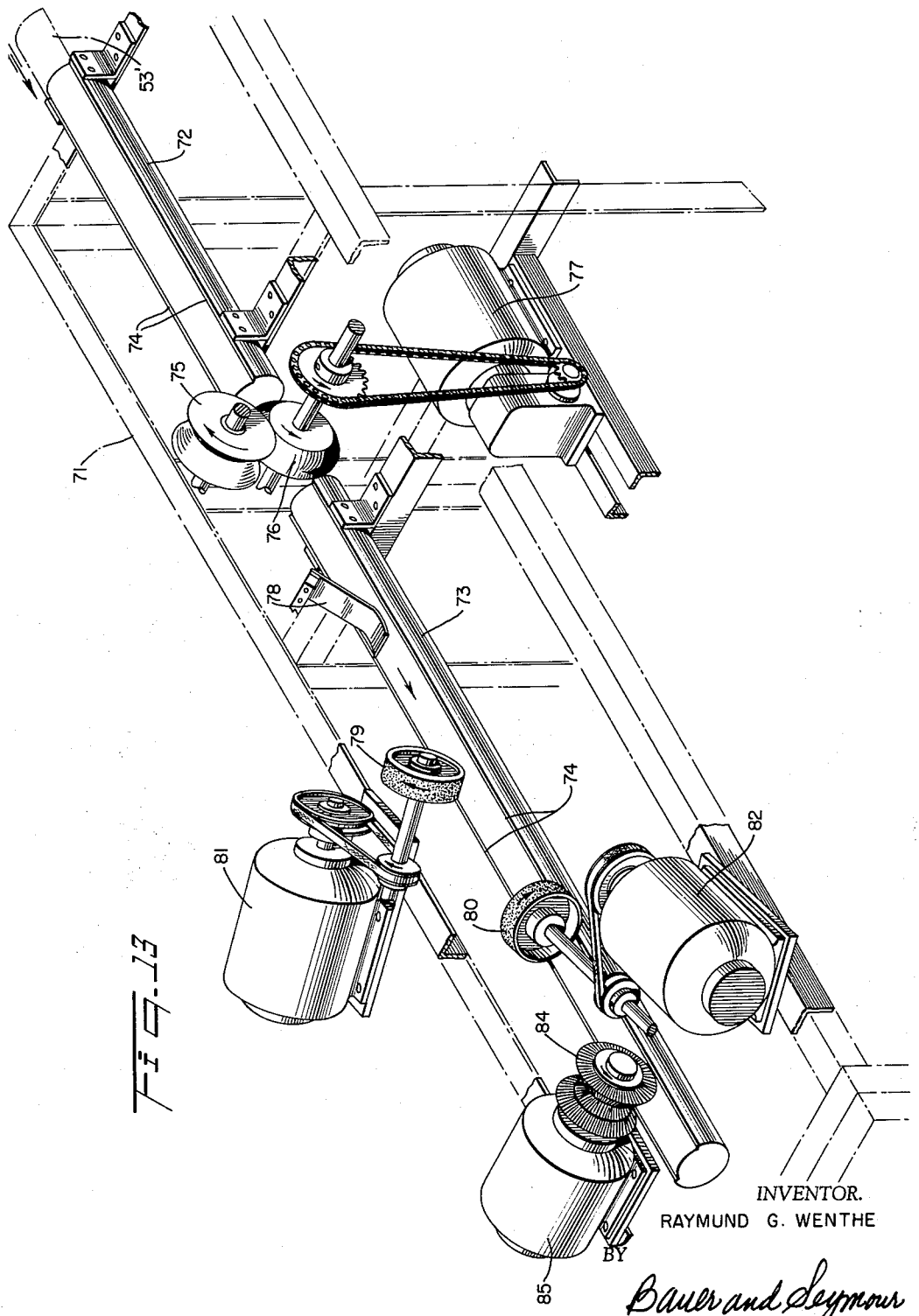

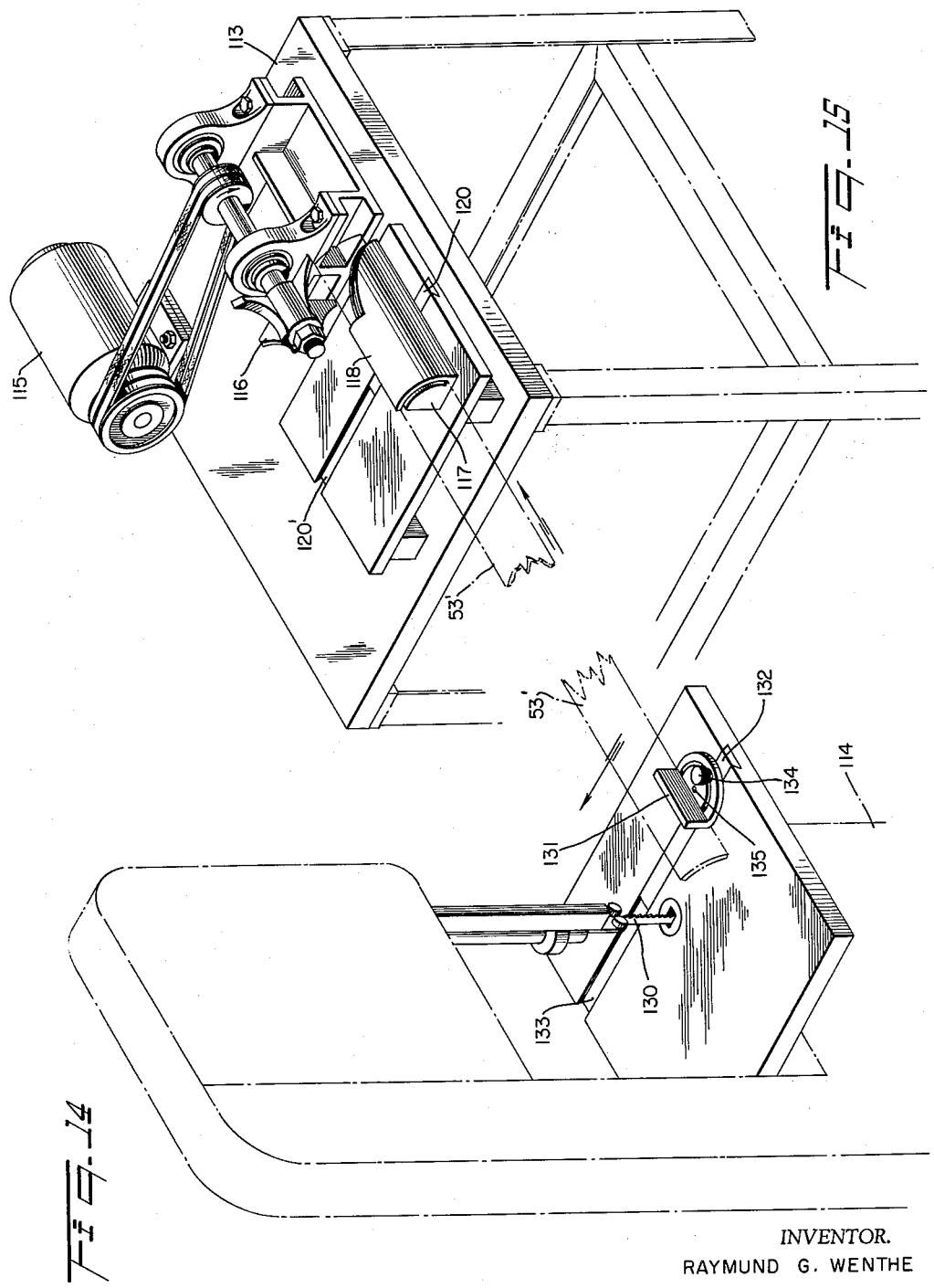

Nov. 9, 1965     R. G. WENTHE     3,216,875
METHOD OF MAKING STRUCTURAL MATERIALS
Filed April 17, 1958     5 Sheets-Sheet 5
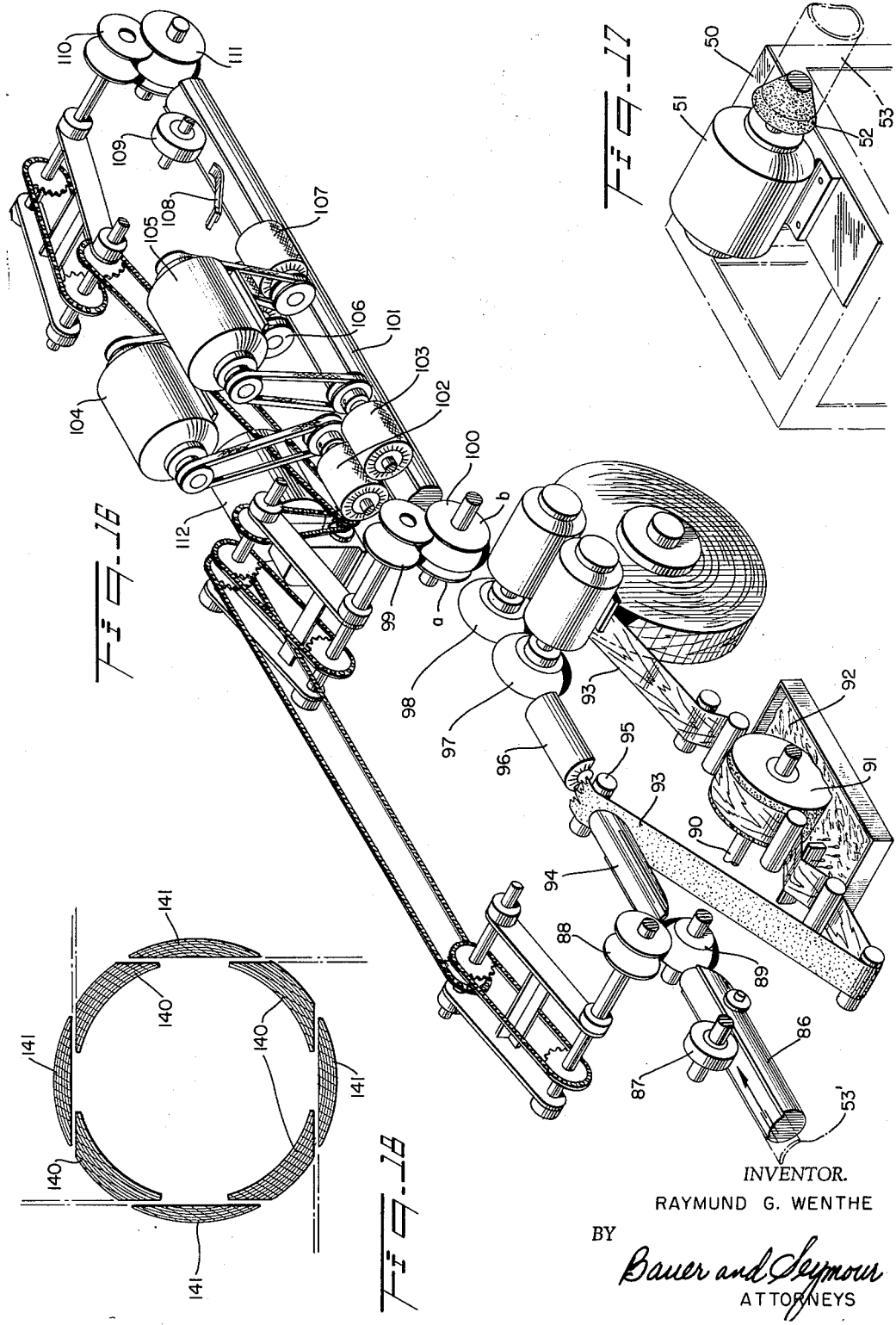
INVENTOR.
RAYMUND G. WENTHE
BY
Bauer and Seymour
ATTORNEYS United States Patent Office 3,216,875
Patented Nov. 9, 1965

3,216,875
METHOD OF MAKING STRUCTURAL
MATERIALS
Raymund G. Wenthe, Fair Lawn, N.J., assignor to
John L. Seymour, New York, N.Y.
Filed Apr. 17, 1958, Ser. No. 729,086
9 Claims. (Cl. 156—154)

This invention relates to building materials, particularly to cove and trim, and to methods of making them. This case is a continuation-in-part of my application Serial No. 513,857, filed June 7, 1955, now abandoned.

Materials called cove and trim are used in building construction. Cove is often employed to cover a joint, for instance between wall and ceiling, and to give a curved and finished appearance to such otherwise unsightly places. Trim is often employed along a wall as a buffer to arrest chair backs and prevent marring of the wall surface. Cove and trim are usually made of wood by milling wood strips to a desired shape, for instance concave on its exposed face for cove and convex for trim. A material disadvantage of cove and trim in this is that ceilings and walls are almost never rectilinear, but curve as left by the builder or plasterer, with the result that unsightly gaps appear between the edges of wooden cove and trim and the walls to which they are applied.

Such building materials are costly, relatively inflexible, and difficult to apply on the job. As walls settle and joists dry out they sometimes tend to pull away from the wooden cove nailed to them. Nails are used to fasten them in place, in most cases, and the nail heads tend to show. Filling is resorted to to fill in gaps between cove or trim and wall, which is an additional operation.

In the manufacture of buildings, particularly when wallboard is employed, it is desirable to cover the joint between abutting, angularly positioned pieces of board by means of curved wooden slats called "cove." Thus, where the joint occurs between the wall and ceiling, an ugly gap would appear if the gap were not covered by a curved wooden strip which is nailed to the wall and to the ceiling. When painted, this cove should have the same appearance as the painted wall and ceiling, and adds a decorative and pleasing finish to the room.

The cove of the prior art was expensive to make and not too satisfactory because after a period of time, with the settling of the house and the tension applied to the joints and the nails, the cove frequently tended to separate from the wall or ceiling, producing an unsightly appearance.

In general, cove was made of straight-grained, clear lumber and was consequently reasonably expensive. Lumber is heavy and the shipping cost is proportionate.

It has been deemed necessary to fasten cove through the paneling into the beams and joists. This has not proved satisfactory because of the phenomenon of nail protrusion which arises from structural movement, shrinkage of lumber, improper driving of nails, and other causes not discovered. One of the more serious problems was the tendency of nails to work out of studs and joists and to protrude above the surface.

The painting of wooden cove has been accompanied by the usual painting of new wooden surfaces. Grain must be obliterated, sap streaks must be sealed in, knots must be hidden, and it is generally necessary to shellac first and thereafter apply successive coats of paint.

When wooden cove is mounted, it is necessary, for a perfect job, to countersink the nails and putty over them.

The totality of the foregoing points results in a rather costly and somewhat unsatisfactory construction.

It is an object of this invention to provide a new kind of cove and trim which is lighter in weight, more flexible, easier to apply, cheaper, more readily adapted to a large number of shapes and to more decorative forms, requiring no nails, and attachable to the wall board itself as distinguished from attachment to the structural members such as beams, studs and joints.

Another object of the invention is to reduce the time required to apply cove and trim and to simplify its application.

Another object is to simplify and reduce the cost of painting cove and trim.

Another object is to form a floating corner in building construction, eliminating nails near the ceiling.

Another object is to prepare a novel cove and trim from a known material by a novel method.

The objects of the invention as to process are accomplished, generally speaking, by dividing a tube composed of a wound flexible pellicle, such as paper, having sufficient rigidity to be cut, drilled, sawed, and shaped by tools into longitudinal sections. In a preferred form of the invention, the sections, before or after production, are coated with surfacing material such as decorated paper having a pleasing pattern or high finish. The objects as to process are attained by the method set hereinafter.

The invention as to the novel cove and trim comprises a longitudinal cylindrical section of wound tube of sufficient thickness to be shaped as described above. The novel cove and trim also comprise pellicular laminae, preferably attached one to another throughout their areas of contact, numerous successive laminations whereof are of progressively reduced width or length or both, and in sufficient number to have the qualities of tool-shaping above set forth. It also includes such cove and trim including an exterior ply of different material.

As the structure presented by the use of this cove in building construction is novel, the invention as to such construction comprises adjacent panels forming a joint which is covered with a section of wound tube or its equivalent attached to the adjacent panels.

Wound tube is well known in industry. It is composed of a multitude of layers of paper or cellophane, or the like. There are several ways of producing it, among which spiral winding is commonly employed. In my invention I employ this wound tube. It is frequently made of re-used paper products and is consequently cheap. The plies or laminations are firmly attached to one another. The tube can be made thin or thick. In its natural state its appearance is not decorative, but by my invention it becomes so. It can be produced in any desired length. It constitutes the preferred material for making my new cove.

The apparatus described in the accompanying drawings is shown in the steps of a new method of making the new product. Some of these steps may be individually new and some may be old, but, in combination, they are new and produce a new result, a product having the highest utility in building.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention. Reference for this latter purpose being had primarily to the appended claims.

In the drawings, wherein like reference characters refer to like parts throughout the several views:

FIG. 10 is a transverse section suggesting the multitudinous lamination and a different angular relation of attaching surfaces.

FIG. 11 is a section through a wound paper tube sectioned according to the invention.

FIG. 12 is a perspective view of a tube-sawing machine in operation.

FIG. 13 is a perspective view of a grinding machine in operation on one of the cove or trim slats produced in a previous operation such as that of FIG. 2.

FIG. 14 and FIG. 15 are perspective views of shaping tools of different sorts in operation on a single slat of cove or trim.

FIG. 16 is a perspective view of a machine applying a final decorative coat to the shaped and trimmed cove or trim.

FIG. 17 is a perspective view of a machine for preliminarily shaping an end of the tube before sawing it into lengths. This step of the process may constitute a step preliminary to that of FIG. 2.

FIG. 18 illustrates the possibility of producing different shapes by skillful cutting of the tube, some slats being more suited to cove and others to trim.

Figure 1:
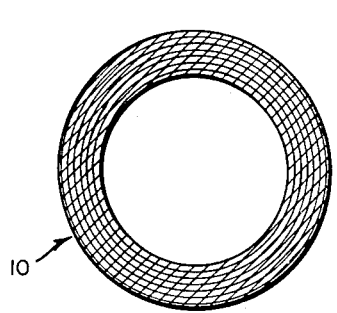
FIG. 1 shows a transverse section through a wound tube.
Figure 2:
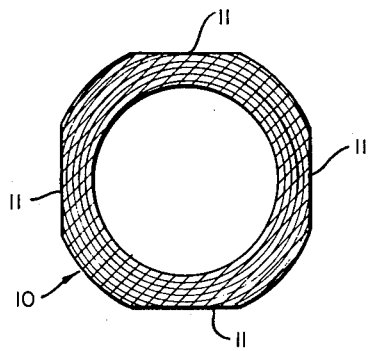
FIG. 2 is a longitudinal section through the tube in the second stage of manufacture.

Referring now to the numerals of the drawings, 10 represents a wound tube, which may be presumed for the purposes of illustration to have a diameter of 3 inches, a wall thickness of 7/16 inch and a length of 4 feet. This wound tube is selected as the first step of the method of preparing the cove. The second step involves trimming the sides of the tube, as in FIG. 2 at 11. In effect, chords are drawn across the tube near the opposite ends of a diameter of the tube and the outer plys are removed by shaving the tube down to the chord. The shaving can be accomplished by knife blades, by grinding wheels, or in any desired manner. This produces a tube having flat sides. As many of these flat sides can be provided as desired. For instance, if one desires cove occupying an arc of 90°, one trims the outside of the tube to the desired depth at four places on radii 90° from each other; if one desires cove covering 120°, one trims the outside of the tube at 120° from each other; if one desires cove consituting a ⅛ round, one trims the side of the cove at 45° from each other.

In a third step of the process, the tube is cut into longitudinal sections by slitting it apart, usually along the axis of the trimmed areas. This produces cove comprised of longitudinal sections of wound tubing having flattened edges produced by the trimming of the tube. These flattened edges serve to make flat contact and to match the surfaces to which the cove is to be attached. The cove thus produced has numerous plies or laminations which are of progressively reduced width. By extending the trimming down until the undermost plies are reached, one produces cove which is substantially entirely composed of plies of progressive differing width. By carrying the trimming only half way through the windings of the tube, one produces cove having numerous plys of progressively decreased width based upon numerous plies of nearly the same width.

There is thus but little limit to the shape of cove when made by this novel process. This constitutes a material advantage over the wooden and other types of cove, which have been severely limited as to the number and type of shapes which could be produced.

The cove of my invention can be applied in novel ways which were not available to the prior art. For example, this cove can be readily glued to the paneling which forms the abutting parts of the joint which is to be covered and in so doing, being supported by the panels alone, and being attached to and supporting them throughout its length, will yield with them without becoming unfastened, thus forming a floating corner having more flexibility than that which was previously provided.

Another satisfactory method of attaching the cove is by means of staples such as "Bostitch" and "Hotchkiss" staples. Stapling hammers are made and can be used to drive a line of staples through the edge of the cove into the material of the wall board or paneling. Although it would have been thought that nails driven into joists would hold better than staples driven into the wallboard, such is not the case. The staples need not be countersunk and are invisible when covered by paint.

By further reference to the drawings, we can see a number of modifications which are possible with this invention. It is to be understood that these limitations show the great flexibility, but do not exhaust the possibilities, of the invention.

In FIGS. 3, 13, 14, 15 and 16 are the cylindrical sections formed by dividing the trimmed tube in four places at 90° from each other. It should be noted that the trimming of the tube preferably takes place before division into cylindrical sections, but that the tube could be divided into cylindrical sections before trimming, the trimming, if desired, taking place afterward. The cylinders may be circular or oval. The term "cylindrical sections" as used herein refers to those which are prepared by cutting the tube longitudinally.

Figures 4, 5:
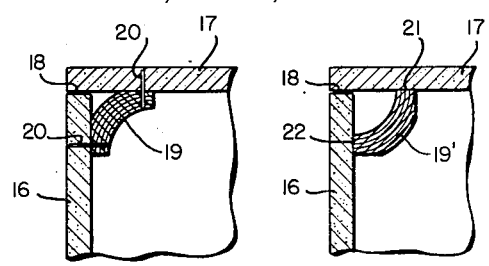
FIG. 4 is a diagrammatic sectional view showing the cove applied over a ceiling joint.
FIG. 5 shows the cove differently applied over a ceiling joint.

In FIG. 4 the wallboard 16 and ceiling board 17 meet at the joint 18 which is covered by the cove 19. In this case the cove has been made by the simple slitting of a partly trimmed tube on radial lines 90° apart so that the cove does not blend itself into wallboard but constitutes a kind of decoration. Staples 20 have been driven through the cove into the boards.

In FIG. 5 a cove 19', identical with that of FIG. 4, has been applied in reverse fashion, being attached to the wallboard 16, 17 along its side edges 21, 22 by glue. The side edges make flat contact with the ceiling 17 and wall 16 having been made by radial cuts through trimmed tube. In FIG. 4 the cove is concave, as seen from the room, and in FIG. 5 it is convex.

Figure 6:
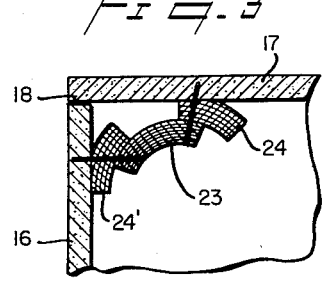
FIG. 6 shows a decorative application employing two types of cove.

In FIG. 6 a decorative effect is secured by combining a quarter-round 23 with two ⅛ rounds, 24, 24', the latter of which are attached to the walls, and the former of which are attached to the latter. The eighth rounds are cut from a tube of the same diameter, and hence of the same curvature, as the quarter round, the difference being that one tube was cut in eight cylindrical sections, whereas the second tube was cut in four cylindrical sections.

Figure 7:
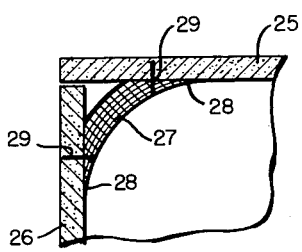
FIG. 7 shows cove of a preferred type in its application to a joint.

In FIG. 7 is shown a ceiling board 25, a wall board 26, and a type of cove which is for many purposes preferred. In this type of cove the trimming of the round tube has proceeded until only a few plys are left, before severing. After severance, the quarter round 27 is so thin at its side edges 28 that it blends into the wall and is invisible when painted, presenting a curved corner which has every appearance of being a part of the walls themselves. The cove is shown as attached by staples 29.

Figure 8:
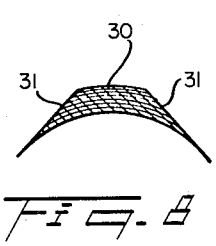
FIG. 8 is a transverse section suggesting the multitudinous lamination and a different angular relation of attaching surfaces.

In FIG. 8 is shown the cross-section of a cove 30, the side edges 31 of which are cut to fit an angle between walls which meet at other than a right angle; the cuts are not radial.

Figure 9:
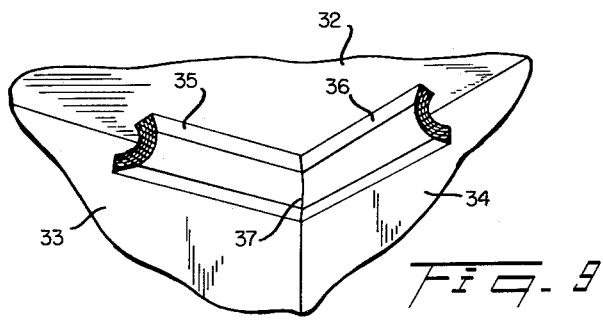
FIG. 9 shows a joint between three walls with mitred pieces of cove covering the triple angle.

In FIG. 9 is shown the meeting of coves at the corner of a room. In this figure is shown a corner of a room with the ceiling 32, one wall 33, another wall 34, one cove 35 and another cove 36. The coves meet at a line 37 which is produced by mitering the ends of the coves 35, 36 at 45° to their respective axes.

In FIG. 10 is shown the cross-section of a cove 39, the side edges 40 of which are cut to fit an angle between walls which meet at other than a right angle; the cuts are not radial. This modification permits the application of cove 39 to a joint having an angle other than a right angle whereby the cove is convex as seen from the room similar to that shown in FIGS. 5 and 9.

The round tube can be readily cut and even sculptured, so that a large number of decorative effects can be secured by differences in trimming and by the application of grooved and other ornamentation.

These moldings or coves are flexible and are fastened directly to the surface of walls and ceilings; they need not be and preferably are not attached to studs and joists. They are flexible by nature, and can be shaped to irregular contours of wall or ceiling, giving the appearance of a straight corner. Being made largely of reclaimed paper pulp, their basic cost is less than half the cost of similar moldings made of wood. They are lighter in weight and cost less to ship. They are applied with a staple gun, or with glue, cement or the like, and are applied more easily and more speedily.

One of the most serious problems in "dry-wall" construction is the tendency of nails to work out and to protrude above the surface of the wall board. The causes of this phenomena are many and varied; shrinkage of lumber; improperly driven nails; structural movement and settlement, etc. In various studies of this problem, it has been determined that, by far, the greatest number of "nail-pops" occur within fifteen inches of the ceiling angles either on the wall panels or on the ceiling panels. The use of the cove of the invention, which is fastened to both wall and ceiling panels at these angles instead of through the panels into the structural members effects a "floating corner" with the wall panels supporting the edges of the ceiling panels, and vice versa, thereby eliminating the possibility of nail-pops, because the nails within fifteen inches of the ceiling angles can be completely eliminated from the wall board. This is novel construction, to eliminate nails from the vicinity of 12" to 15" from a corner.

Since there is no grain, and no sap streaks or knots in the new cover it is not necessary to first apply a coat of shellac over such blemishes to prevent "bleeding" through on successive coats of paint.

Since the material used in the manufacture of the new cove is similar to the surface material on gypsum wall board, the same paints normally used to paint the walls and ceilings are recommended.

Since the moldings are fastened either with glue or with inconspicuous staples, it is not necessary to countersink or "set" the nails and the resultant holes do not have to be puttied.

In FIG. 17 is illustrated a preliminary step of the new method and apparatus for carrying out that step, wherein a frame 50 supports a motor 51 having a conical grinder 52 which is adapted to give an internal bevel to the end of a wound paper tube 53. The paper tube is of sufficient thickness and rigidity to permit the beveling or chamfering of its exposed edges. If desired, the tube 53 may be beveled at both ends. Exterior beveling can be employed by the use of a grinding head with a conical interior. The step of beveling the ends of the tube can be omitted if the order for the material so specifies.

In FIG. 12 the frame 54 supports motors 55, 56, 57, 58 which drive shafts on which are mounted saws 59, 60, 61, 62. These saws are arranged in pairs, the second pair being horizontally displaced from the first and the saws of each pair being mounted in a plane which is at right angles to the plane of the other pair. Thus, the saws of the first pair 59, 60 will cut the tube 53 into halves, and the saws of the second pair 61, 62 will cut the halves into quarters. A mandrel 63 is mounted on supports 64, 65 by means of fin-type separators 66, 67 wihch perform the double function of separating the sections of the slit tube and, by attachment to the support, of maintaining the mandrel 63 concentric with openings 68, 69 in those supports, a sufficient gap existing between the mandrel and the walls of the opening to permit the passage of the sections of the tube. Springs 70, of which there are four, hold the sections of the tube as they pass from the left to the right end of the mandrel.

The tube 53 is fed into the apparatus from the left end, encounters the saws 59, 60, whereby it is separated into vertically arranged halves which engage the saws 61, 62 which divide the halves into quarters. The quarter sections are maintained in separation by fins 66, pass from openings 68, are held against the mandrel by springs 70, are maintained in separation by fins 67, and issue from the right end of the mandrel through openings 69.

In FIG. 13 a frame 71 supports guides 72, 73 which are provided with lift rails 74, 75 spaced apart a distance sufficient to fit a section 53 which issues from the machine of FIG. 12.

Figure 3:
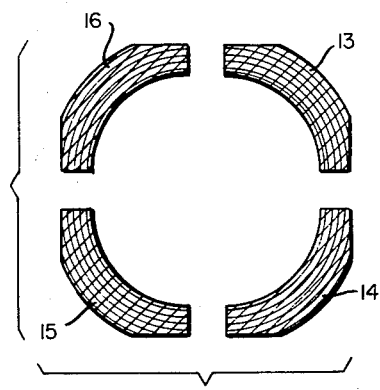
FIG. 3 is a longitudinal section through the tube in its third stage of manufacture.

Section 53' is fed into the machine of FIG. 3 at the right along the rail 72, and is caught between upper and lower interfitting driving rollers 75, 76, driven by motor 77, is held against the surface of guide 73 by spring 78, and engages grinding wheels 79, 80, driven by motors 81, 82, which grind the edges of the section as indicated at 83 in FIG. 17, or as desired. Inasmuch as the material of the section is fibrous, the grinding may deposit broken fibers on the surface, and these are removed by a rotary brush 84 driven by motor 85. The cove or trim section thus prepared is then ready for the next step of the process which is preferably that shown in FIG. 16.

We will assume for purposes of illustration that FIG. 16 shows the application of a decorative and protective surface layer to the relatively rough and porous surface of the sectioned tube. Section 53' is received on the guide 86 beneath a roller 87 and by a pair of driving rollers 88, 89, which have curved surfaces conforming to the curvature of the section and which are connected by shaft 90 to applicator roller 91, which dips at its lower circumference into a bath 92 of adhesive and transfers it to one surface of a strip of surfacing material 93, which may be paper, cellophane or the like, and may have a design, superior strength, or a particular texture. Strip 93 is moved by the notched driving rollers over a guide 94 which comes at its edges into engagement with the adhesive surface of the strip 93. The speed of the strip and the speed of section 53' are alike as they pass over port 95 and are subjected to the pressure of a cylindrical buffer 96 which forces the strip into full engagement with the concave side of the section. Two rollers 97, 98, out of contact with each other and rotating in the same direction, and having rounded surfaces for engagement with the coating section, complete the process of eliminating air bubbles and firmly joining the strip to the section.

Another pair of rollers 99, 100, similar in construction to rollers 88, 89, except that roller 100 is provided with flanges a, b which grasp the section and move it into engagement with the guide surface of guide 101. The flanges a, b turn up the edges of the strip where they project beyond the edges of the section, and brushes 102, 103, driven by motors 104, 105, bend the edges over the convex side of the section until the adhesive contact is made. Two rollers 106, 107, also driven by motors 104, 105, complete the sticking of the edges of the paper to the back of the section. A spring 108 and a roller 109 aid in guiding the strip to rollers 110, 111 which eject it for storage or further treatment. The rollers 88, 89, 99, 100, 110, 111 are driven by chains or gearing from a motor 112.

The apparatus thus described will apply a surface to one side only, to one side and the edges on the other side, or to the entire surface of both sides of the section. By reversing the curvature of the parts, the application can be made to take place either to the convex or to the concave side of the section.

After the section of cove or trim has thus been prepared, it can be trimmed to any desired size and shape in the factory by sawing, carving and cutting. In FIGS. 14 and 15 are shown the methods of carrying out two of these operations. Support 113 carries a motor 115 which drives rotary knives 116 which are shaped to provide a coping on the end of section 53'. By this means the ends of the section are coped for immediate application on the job. The section is held in a form, having inner face 117 and outer face 118, which is slidable across the table on guide 120 in groove 120'.

The support 114 carries a band saw 130 and a support 131 mounted on guide 132 which slides in guide groove 133. The support 131 comprises an abutment against which one face of the section 53' is rested during the operation. The support 131 is pivotally mounted on guide 132 by means of a set screw 134 and a pivot 135. A similar arrangement for a pivotal mounting for face 118 on guide 120 may be provided. Thus, the direction of the cut at each end can be usefully changed.

In FIG. 11 there is shown a tube which has been sectioned by the apparatus of FIG. 12 and which has been shaped at its edges 83, 84, 85, 86 by means which have been described hereinabove. Each section of the cove or trim when thus prepared is adequately thick along each of its longitudinal sides so that both sides can be made to rest flat against the surface to which they are applied. Such pieces of cove are useful as shown in FIGS. 5 and 9 for application with an externally presented complexity. On the other hand, as shown in FIGS. 7, 4, 3 and 8, the shape of the section may be prepared by cutting, sawing or grinding so as to present flat extensive areas against the surfaces encountered and a concavity opposed to view. By cutting sections of coving as shown in FIG. 6, a variety of decorative effects can be achieved.

In FIG. 18 is shown a novel method of cutting a tube so as to provide pieces 140 with both inner and outer curvatures, and pieces 141 with a curvature on one side and a flat surface on the other. The pieces 140 as thus provided are useful for application as cove to right-angular corners. This can readily be seen by imagining that the lines of the corners represent the corners of a room. The pieces 141 are useful for application against flat walls as trim.

The trim and cove which are provided by this invention are a material improvement over all known forms of trim and cove. They constitute new articles of merchandise that have no competition in any field. They may be nailed in place and the nails sink readily into the material, presenting, in effect, a continuous surface to which paint may be applied. The porosity of wood and paper for paint is overcome by applying to the surfaces as described paper or other pellicles, for example, regenerated cellulose, which are receptive to paint but do not absorb substatial quantities of it.

As many apparently widely different embodiments of the present invention may be made without departing from the spirit and scope thereof, it is to be understood that the invention is not limited to the specific embodiments.

What is claimed is:

1. The method of making cove that comprises trimming the sides of a wound tube along chords, and dividing the tube lengthwise in the trimmed areas.

2. The method of making cove that comprises trimming and dividing a wound tube lengthwise along lines extending parallel to its axis into segments of a cylinder constituting strips having edges departing from the cylindrical and set at an angle to each other.

3. The method of making cove that comprises, as one operation, dividing a wound tube longitudinally along lines extending parallel to its axis to form segments of a cylinder constituting strips, and, as another operation which is distinct from the said dividing in character but not necessarily in time, reducing numerous successive plies progressively to provide non-cylindrical edge portions for the sections.

4. The method of making structural materials such as cove and trim that comprises cutting a tube lengthwise by planes which are angularly disposed to each other and intersect outside the tube, each of said planes intersecting the tube twice.

5. The method of making structural materials such as cove and trim that comprises cutting a tube having a plurality of layers of spirally wound cellulosic sheet material lengthwise into a plurality of segments, and shaping edges thereof into conformity with the shape of an element of structure with which the structural material is to be used.

6. The method of making structural material such as cove and trim that comprises countersinking an end of a wound paper tube, of sufficient thickness to have rigidity and moderate flexibility and to keep its form during cutting, coping, sawing and nailing, and cutting it into longitudinal segments by sawing, trimming its edges by grinding a longitudinal edge and coping a transverse edge, and applying adhesive and a fabric to a surface thereof.

7. The method of making structural material such as cove and trim from a wound paper tube of sufficient thickness to have rigidity and moderate flexibility and to retain its form during cutting, coping, sawing and nailing, comprising the steps of cutting said tube into longitudinal segments, grinding the longitudinal edges of each segment, and applying a layer of decorative material to a surface of each said segment.

8. A method of forming cove and trim which comprises performing upon a wound cellulosic tube which has sufficient thickness, imparted by a plurality of wound, adhesively interattached plies, to have rigidity and moderate flexibility and to sustain cutting, coping, sawing, nailing, and drilling, the acts of cutting the tube along its longitudinal axis into segments having flat faces, and trimming the sides thereof whereby to provide the resulting pieces with a plurality of pairs of faces oriented in different directions.

9. A method of forming cove and trim which comprises performing upon a wound cellulosic tube which has sufficient thickness, imparted by a plurality of wound, adhesively inter-attached plies, to have rigidity and moderate flexibility and to sustain cutting, coping, sawing, nailing, and drilling, the acts of cutting the tube parallel to its longitudinal axis into segments having flat surface areas disposed for attachment to a plurality of separated wall areas.

References Cited by the Examiner

UNITED STATES PATENTS

| 110,704 | 1/71 | Webster | 20—74 |
|---|---|---|---|
| 278,957 | 6/83 | Heft | 138—154 |
| 374,133 | 11/87 | Tainter | 138—150 |
| 383,612 | 5/88 | Bertling | 20—74 |
| 448,972 | 3/91 | Lynch | 50—70 X |
| 781,376 | 1/05 | Sorenson | 20—91 X |
| 1,163,375 | 12/15 | Selfridge. | |
| 2,267,817 | 12/41 | Costa. | |
| 2,677,165 | 5/54 | Copenhaver | 138—145 |
| 2,720,899 | 10/55 | Miller | 144—309.10 |

FOREIGN PATENTS 6,912    5/86    Great Britain.

CHARLES E. O'CONNELL, *Primary Examiner.*

ISAAC LISANN, WILLIAM I. MUSHAKE, JACOB L. NACKENOFF, *Examiners.*